(12) United States Patent
Xu

(10) Patent No.: US 8,733,220 B2
(45) Date of Patent: May 27, 2014

(54) MITER SAW

(75) Inventor: Kesong Xu, Jiangdong District (CN)

(73) Assignee: Chervon (HK) Limited, Wanchai (HK)

( * ) Notice: Subject to any disclaimer, the term of this patent is extended or adjusted under 35 U.S.C. 154(b) by 149 days.

(21) Appl. No.: 13/169,677

(22) Filed: Jun. 27, 2011

(65) Prior Publication Data

US 2011/0314989 A1    Dec. 29, 2011

(30) Foreign Application Priority Data

Jun. 28, 2010   (CN) ...................... 2010 2 0241092 U

(51) Int. Cl.
    *B26D 1/18*   (2006.01)

(52) U.S. Cl.
    USPC .............................................. 83/490; 83/581

(58) Field of Classification Search
    USPC .............. 83/581, 471.1–471.3, 483–490, 397
    See application file for complete search history.

(56) References Cited

U.S. PATENT DOCUMENTS

| | | | | |
|---|---|---|---|---|
| 4,765,098 A | * | 8/1988 | Duff et al. ...................... | 451/236 |
| 5,060,548 A | * | 10/1991 | Sato et al. ...................... | 83/471.3 |
| 5,839,339 A | * | 11/1998 | Sasaki et al. .................. | 83/471.3 |
| 6,170,373 B1 | * | 1/2001 | Sasaki et al. ...................... | 83/485 |
| 6,997,091 B1 | * | 2/2006 | Shibata ........................... | 83/399 |
| 7,337,702 B2 | * | 3/2008 | Parks et al. .................... | 83/471.3 |
| 7,726,225 B2 | * | 6/2010 | Imamura et al. .............. | 83/471.3 |
| 7,905,167 B2 | * | 3/2011 | Ushiwata et al. ............... | 83/581 |
| 7,997,177 B2 | * | 8/2011 | Ushiwata et al. ............... | 83/473 |
| 8,161,858 B2 | * | 4/2012 | Aoyama ......................... | 83/490 |
| 8,266,996 B2 | * | 9/2012 | Thomas et al. .............. | 83/468.2 |
| 8,413,562 B2 | * | 4/2013 | Kani .............................. | 83/529 |

* cited by examiner

*Primary Examiner* — Omar Flores Sanchez
(74) *Attorney, Agent, or Firm* — McDermott Will & Emery LLP

(57) ABSTRACT

The present invention provides a miter saw having a rotary-disc assembly, a swing arm assembly rotatably connected with the rotary-disc assembly, a sliding rod assembly slidably connected with the swing arm assembly, and a cutting head rotatably connected with the sliding rod assembly around a turning shaft of a head section. The miter saw may also have a sliding fixed-length mechanism for the cutting head which is used to fix the cutting head to a specific position relative to the swing arm assembly. When the cutting head is fixed at the specific position, and pivoted around the turning shaft to a lowermost position, an intersecting point between a plane of a supporting surface of a fence and a cutting edge of a sawblade is located above an intersecting line between the supporting surface of the fence and a supporting surface of a base plate.

2 Claims, 9 Drawing Sheets

MITER SAW

CROSS-REFERENCE TO RELATED APPLICATIONS

This application claims priority to CN 201020241092.X, filed Jun. 28, 2010, which is hereby incorporated by reference.

FEDERALLY SPONSORED RESEARCH OR DEVELOPMENT

Not Applicable.

TECHNICAL FIELD

The present invention relates to a miter saw, and more particularly to a pull-rod type miter saw, which pertains to the technical field of electrical tools.

BACKGROUND OF THE INVENTION

For frames for paintings, crest lines of European style furniture and corner lines of European style decorations, decorative frames are usually used and formed by decorative strips abutted against each other. Because the angle of abutment may be different than the standard right-angle, the cooperation of the angles for each surface may be very complicated and may require the abutting surfaces between the decorative strips to be a complex miter surface. For example, the intersected oblique angles may be formed between the abutting surface of the decorative strip and other sides thereof. FIG. 1 is a schematic view illustrating abutted decorative strips, and FIG. 2 is a schematic view illustrating the abutting surfaces of the two decorative strips. As shown in FIGS. 1 and 2, a first abutting joint 12 and a second abutting joint 14 are respectively formed between decorative strips 10. To take the first abutting joint 12 as an example, the abutting surfaces of the first abutting joint 12 include a first abutting surface 122 and a second abutting surface 124. To cut this kind of abutting surface, it usually requires a miter saw with a complex miter function.

A first method for cutting the abutting surface of a decorative strip includes placing the decorative strip on a workbench and cutting it with a particular combination of cutting angles including a miter cutting angle and a bevel cutting angle. For example, if the leaning angle of the abutting surface is 38°, the combination of cutting angles includes the miter cutting angle of 31.6° and the bevel cutting angle of 33.9°. The advantages of this method are that the requirements for the machine are lower and an ordinary miter saw can be adapted for operation. While the deficiencies are that the operation is complicated, the match or the abutment is easily mixed up such that it may be too hard for the operator, and only one of the combinations of angles can be applied to cut the abutting surfaces.

A second method for cutting the abutting surface of the decorative strip includes leaning the decorative strip against a fence having an upright supporting surface, then arranging the bevel cutting angle of the miter saw at 0° and adjusting the miter saw to a certain miter cutting angle to perform the cutting. The miter cutting angle commonly used is leftward 45° or rightward 45°, and the miter cutting angle of a special abutment can be obtained by additional calculation. The advantages of this method are that since the angle between the decorative strip and the upright supporting surface of the fence is consistent with the angle between the decorative strip and the wall during actual installation, the cutting operation for the abutting surface of the decorative strip is easier and does not require additional manipulation thereby increasing the efficiency of the cutting operation. However, the defects are that the requirements for the machine are higher, and it usually requires a machine with a specific structure.

Comparing the two methods, the second cutting method has many advantages. Many miter saws on the market can be used to cut the abutting surface of the decorative strip with the second cutting method. However, it is difficult to cut the abutting surface of a large sized decorative strip leaned at 38° with most miter saws, and only a few of the larger sized miter saws can accomplish the cut. Furthermore, for customers, the cost for purchasing the additional larger sized miter saw is often too high. As another option, a non-conventional sized saw-blade could be adapted to be used in a smaller sized miter saw, but it is difficult to find a non-conventional sized saw-blade for an ordinary operator.

SUMMARY OF THE INVENTION

The object of the present invention is to provide a miter saw suitable for cutting the abutting surfaces of various sized decorative strips. By equipping a miter saw with a simple structure, the abutting surfaces of large sized decorative strips leaned at various leaning angles can be cut by a smaller sized miter saw.

In order to solve the above technical problem, the present invention provides a miter saw having a rotary-disc assembly, a swing arm assembly rotatably connected with the rotary-disc assembly, a sliding rod assembly slidably connected with the swing arm assembly, and a cutting head rotatably connected with the sliding rod assembly around a turning shaft of a head section. It also may have a sliding fixed-length mechanism for the cutting head which is used to fix the cutting head to a special position relative to the swing arm assembly. And when the cutting head is fixed at this special position and pivoted around the turning shaft to a lowermost cutting position, an intersecting point between a plane of a supporting surface of a fence and a cutting edge of a saw-blade is located above an intersecting line between the supporting surface of the fence and a supporting surface of a base plate.

The sliding fixed-length mechanism of the above miter saw may include a fixed-length member located on the sliding rod assembly, and a locking device located on the swing arm assembly for selectively locking the fixed-length member. At a selected position, the fixed-length member is locked by the locking device.

The locking device of the above miter saw may also have a locking member mounted on the swing arm which is able to move up and down linearly, a hook rotatably connected to the swing arm and also connected with the locking member by a guide screw, and a return spring arranged between the locking member and the swing arm assembly.

By equipping the miter saw with the simple sliding fixed-length mechanism for the cutting head, the special position of the cutting head can be arranged quickly so as to conveniently cut the abutting surfaces of the large sized decorative strips (for instance, 6 inches) at various leaning angles using a common smaller sized miter saw without impacting the cutting parameters and the structure of the miter saw. For a larger sized miter saw, this arrangement improves the cutting capacity for decorative strips such that it can be applicable to cut the decorative strips of special sizes.

BRIEF DESCRIPTION OF THE DRAWINGS

To understand the present invention, it will now be described by way of example, with reference to the accompanying drawings in which:

FIG. 5b is a schematic view illustrating a first triangle A1 in FIG. 5a;

FIG. 5c is a schematic view illustrating a second triangle A2 in FIG. 5a;

DETAILED DESCRIPTION

The detailed embodiment of the present invention will be further explained herein below with reference to the drawings.

Figure 1:
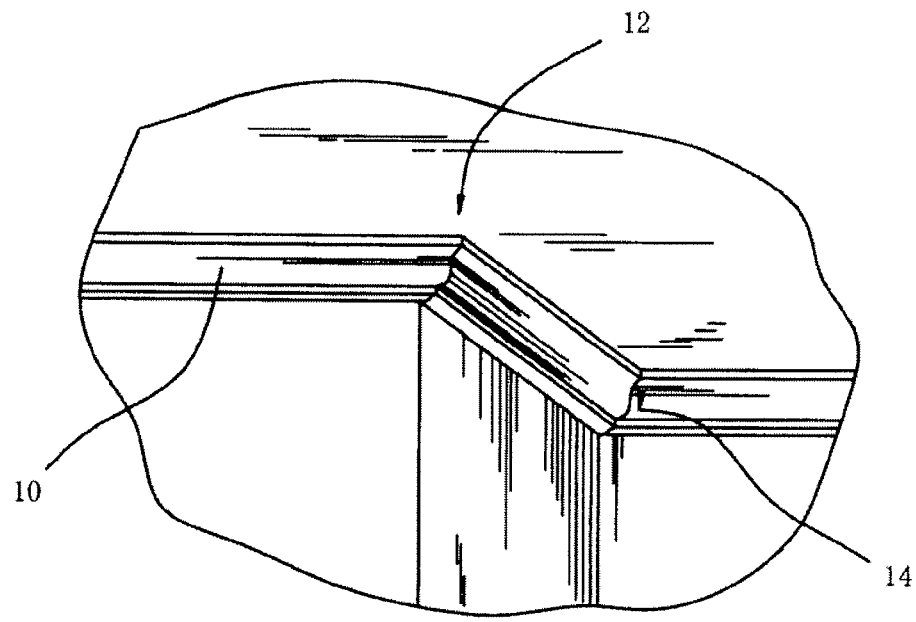
FIG. 1 is a schematic view illustrating abutted decorative strips.
Figure 2:
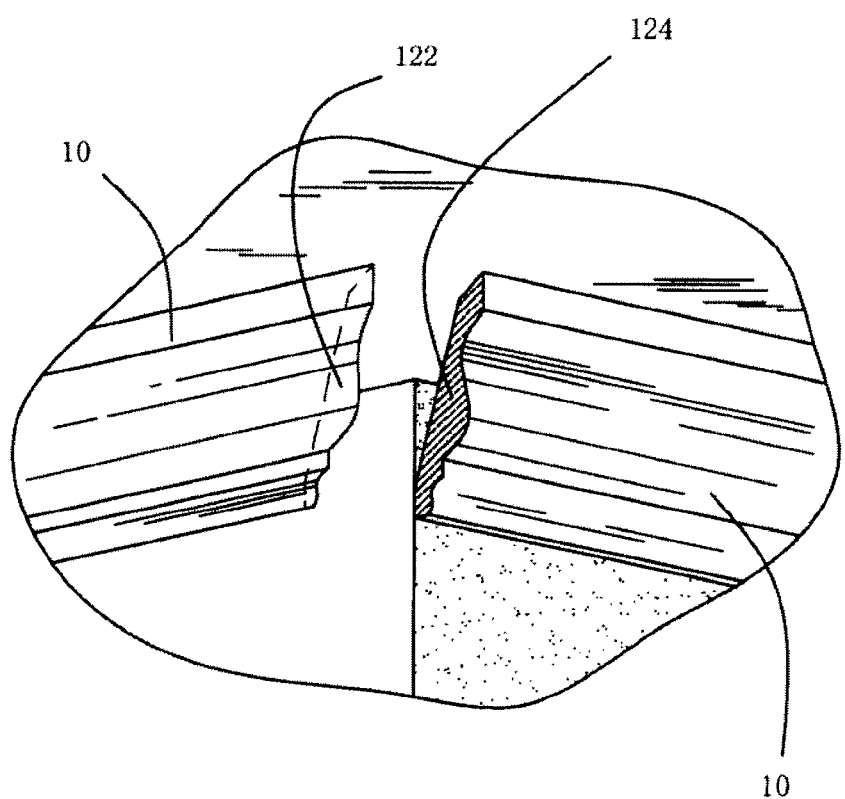
FIG. 2 is a schematic view illustrating abutting surfaces of two decorative strips.
Figure 3:
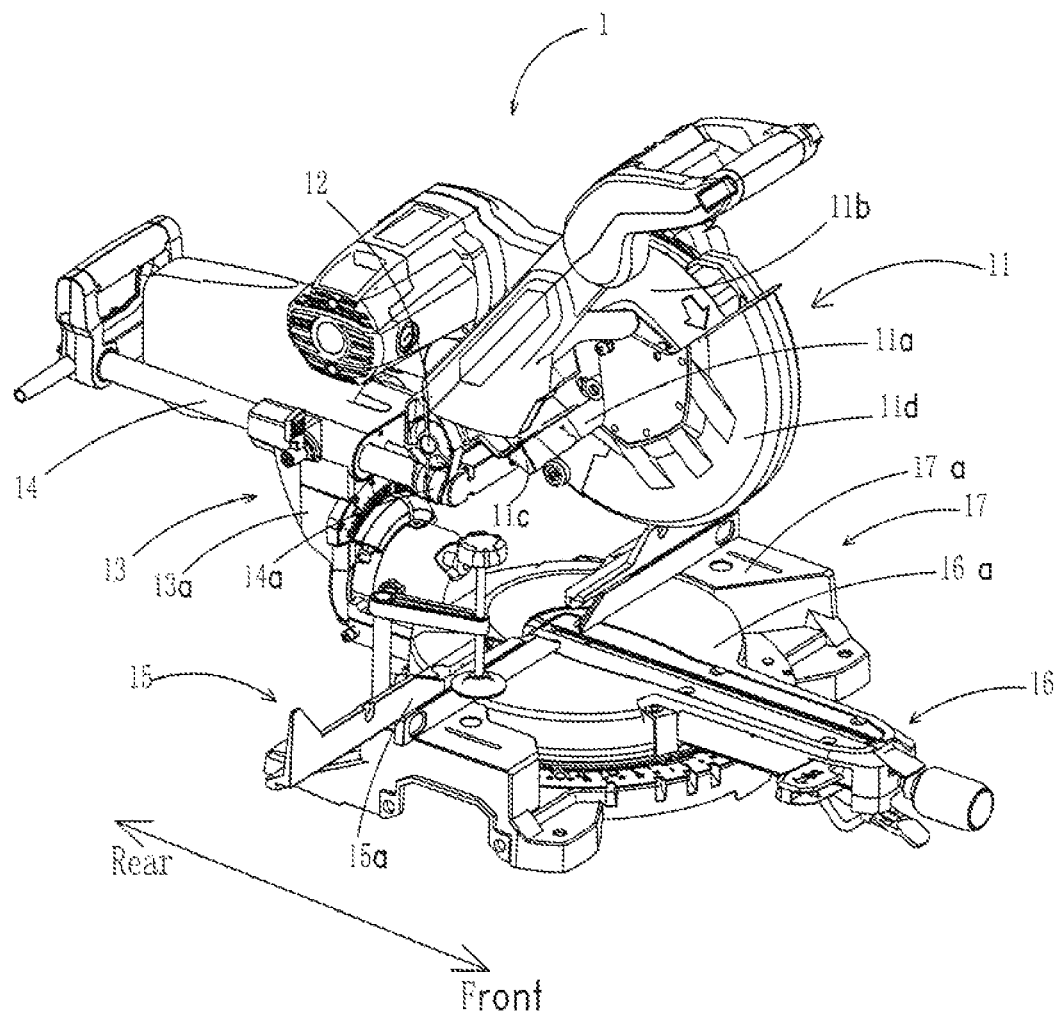
FIG. 3 is a perspective view illustrating a pull-rod type miter saw according to a first embodiment of the present invention.

Referring to FIG. 3, a miter saw in the present invention comprises a rotary-disc assembly 16 having a workpiece supporting surface 16a, a swing arm assembly 13 rotatably connected with the rotary-disc assembly 16, a sliding rod assembly 14 slidably connected with the swing arm assembly 13, and a cutting head 11 rotatably connected to the sliding rod assembly 14 around a turning shaft 12 of a head section. The cutting head 11 comprises a saw-blade having a cutting edge.

Figure 5A:
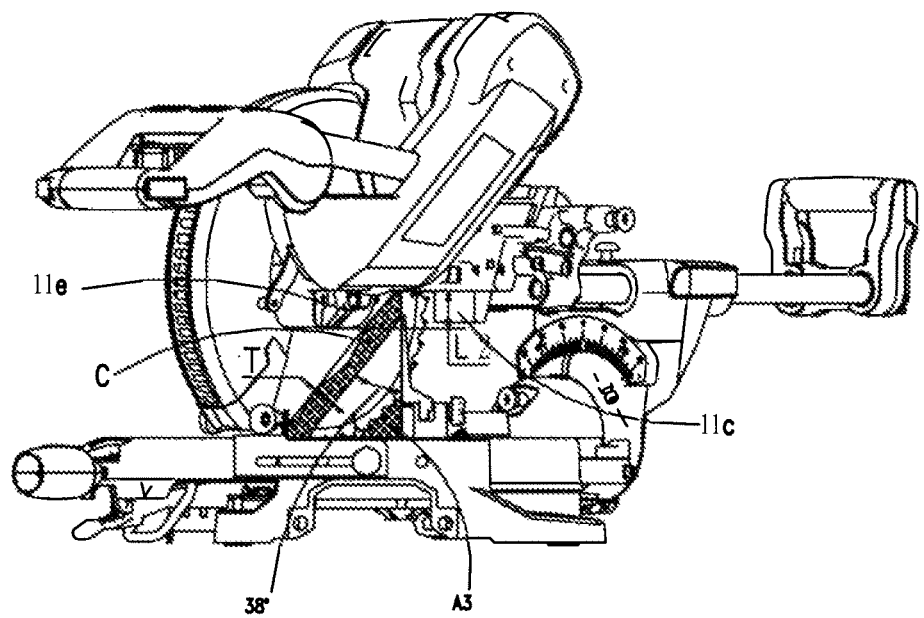
FIG. 5a is a perspective view illustrating the miter saw in FIG. 3 located at a position with the miter cutting angle of rightward 45°.
Figure 5B:
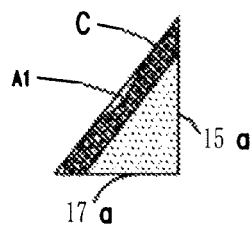
Figure 5C:
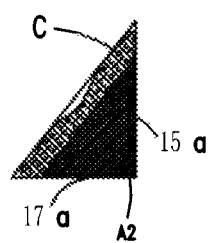

It can be seen from FIG. 5a that, when a decorative strip C is leaned against a fence, the whole decorative strip and two supporting surfaces form a right-angle triangle referred to as first triangle area A1, which has a hypotenuse located in the outmost plane of the outside surface of the decorative strip, and two right-angle sides respectively located on a supporting surface 15a of the fence and a supporting surface 17a of a base plate. The vertex of the right-angle is located at an intersecting line between the supporting surface 15a of the fence and the supporting surface 17a of the base plate. Because the decorative strip has a certain thickness T, generally not more than 20 mm, the whole right-angle triangle except for the thickness is referred to as a second triangle area A2, which has a hypotenuse located in the plane of the inside surface of the decorative strip and two right-angle sides respectively located on the supporting surface 15a of the fence and the supporting surface 17a of the base plate. The vertex of the right angle is located at the intersecting line between the supporting surface 15a of the fence and the supporting surface 17a of the base plate. Often there is no need to cut the second triangle area.

In the case that a notch with a height L2 is formed behind the gear box cover 11b, the gear box cover needs to be as far away and as forward as possible from the supporting surface 15a of the fence to provide enough space to allow one angle portion of the right-angle triangle to enter into the notch.

Figure 4A:
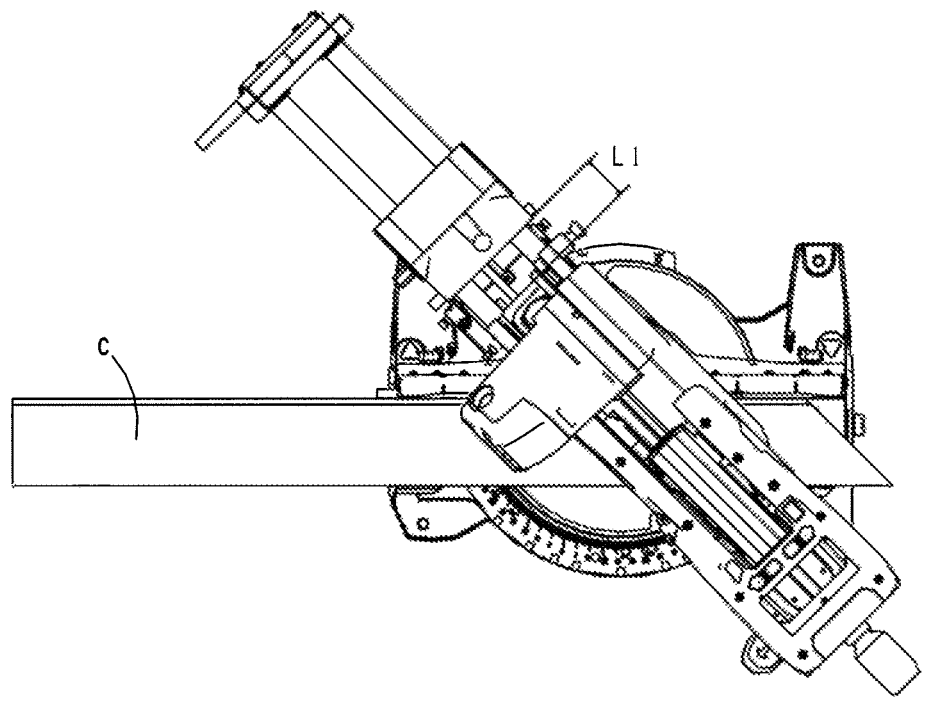
FIG. 4a is a top view illustrating the miter saw in FIG. 3 located at a position with the miter cutting angle of rightward 45°.
Figure 4B:
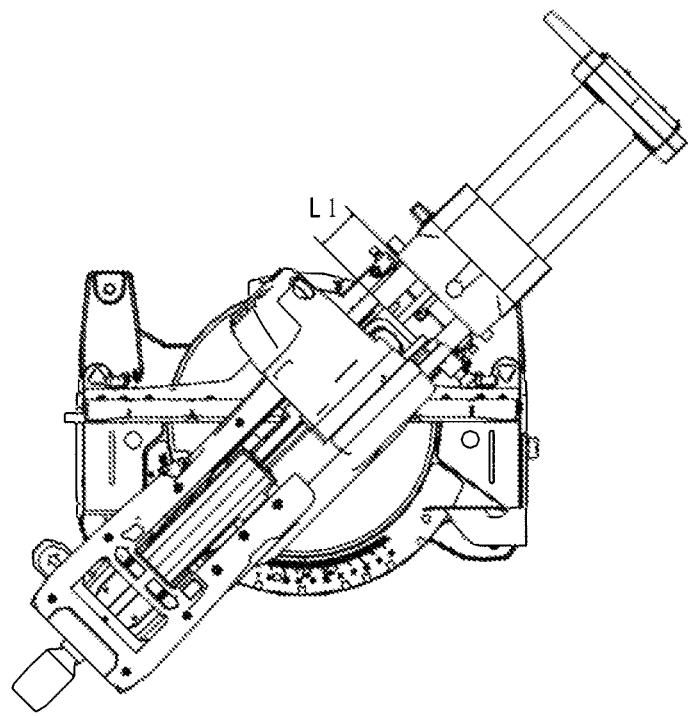
FIG. 4b is a top view illustrating the miter saw in FIG. 3 located at a position with the miter cutting angle of leftward 45°.

Referring to FIGS. 4a and 4b, the whole cutting head 11 is moved forward a distance L1 from the rearmost position and the center of the gear box cover 11e, and thus the saw-blade 11a is horizontally moved away from the supporting surface 15a of the fence to form enough space to allow one angle portion of the decorative strip to enter into the notch with height L2. When the cutting head 11 is pivoted downward around the turning shaft 12 to a lowermost position, an area is formed that is referred to as a third triangle area A3 (as shown in FIG. 5a with a dashed portion indicated by A3). It has a hypotenuse tangential to the edge of the saw-blade, and two right-angle sides located on the supporting surface 15a of the fence and the supporting surface 17a of the base plate. The third triangle area A3 is located within the second triangle area A2. Therefore, when the cutting head is pulled out a distance L1, at the lowermost position, the intersecting point between the plane of the supporting surface 15a of the fence and the cutting edge of the saw-blade is located above the intersecting line between the supporting surface of the fence and the supporting surface of the base plate.

Usually there is a dust guide cover 11c behind the saw-blade to protect the sawtooth of the saw blade 11a and to guide the produced chips into a dust collecting bag while cutting. The dust guide cover 11c should be arranged as forward and downward as possible to protect the blade and to guide dust. Because of the dust guide cover 11c, the larger the distance L1 is always better. L1 has a substantially constant value range and the basic principle of the distance value selection is that the thickness area of the whole decorative strip is allowed to be located within the cutting area of the saw-blade and cannot knock against any other components of the miter saw. Meanwhile, the value L1 of the different machines can vary and is related to the specific structure of the machine.

In FIG. 5a, the whole miter saw 1 is shown with the miter cutting angle of rightward 45°. For the miter saw located at a position with the miter cutting angle of leftward 45°, a flange 11f of the saw-blade and a movable shield 11d may contact the workpiece to be cut, but the principle is the same as the miter saw when it is located at the position with the miter cutting angle of rightward 45°.

The object of the present invention is to cut decorative strips with a size below the largest standard size. Due to the third triangle area, it would result in that only the largest sized workpieces can be cut. However, this worry is actually unnecessary, because the miter saw further has a cutting height L3 for the conventional workpiece. When the decorative strip is leaned against fence 15 with a height less than L3, it is unnecessary to pull out the head section with a stroke of distance L1. Certainly, it should be noted that, the length of the right-angle side of the third triangle along the supporting surface 15a of the fence is needed to be smaller than L3 as often as possible.

A cut piece of a decorative strip is designed for indoor decoration and thus needs to be precise and have a high quality of appearance. However, it is difficult to control the stroke of L1 by manual operation. If the distance is incorrect, the workpiece (the decorative strip) may contact other components on the machine and result in decreased precision and negatively effect the appearance. A safety issue may also be raised if the workpiece to be cut is contacted by the components of the machine or if the stroke L1 needs to be manually measured, fixed, and inspected. Therefore, the cutting head 11 needs to be able to be arranged in the position of the stroke of L1 rapidly and effectively. The specific manner is to move the sliding rod assembly 14 at a specific position quickly. That is, moving the cutting head 11 forward with a stroke of L1 as mentioned above. More particularly, a position where the cutting head is pushed nearest to the swing arm, i.e., the position away from the operator, is considered as a first position. Moreover, a position where the cutting head is pulled farther from the swing arm, i.e. the position near the operator, is considered as a second position. In this way, at this position, the cutting head 11 has moved a distance L1 forward from the first position to the second position.

Figure 6:
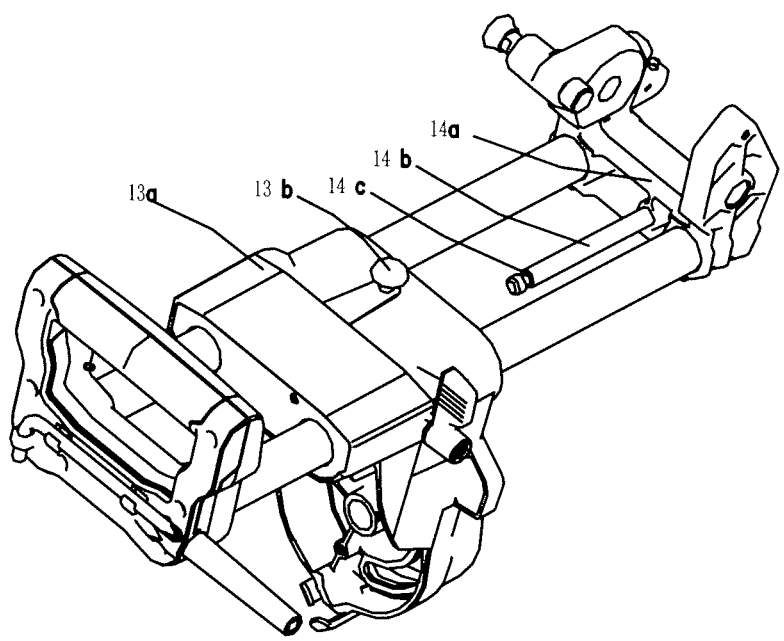
FIG. 6 is a structural schematic view illustrating a pull-rod assembly and a swing arm assembly of the miter saw in FIG. 3.
Figure 7:
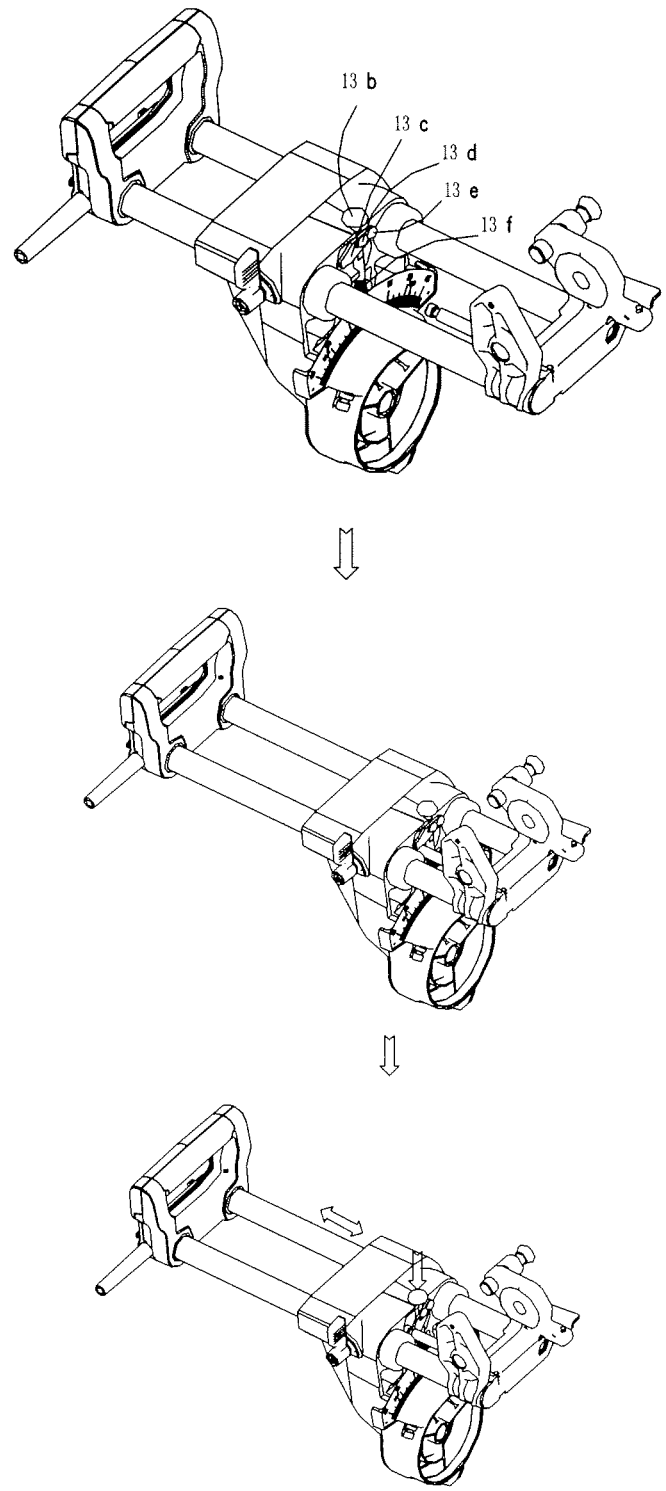
FIG. 7 is a schematic view illustrating a locking process of a sliding fixed-length mechanism for a cutting head of the miter saw in FIG. 3.
Figure 8A:
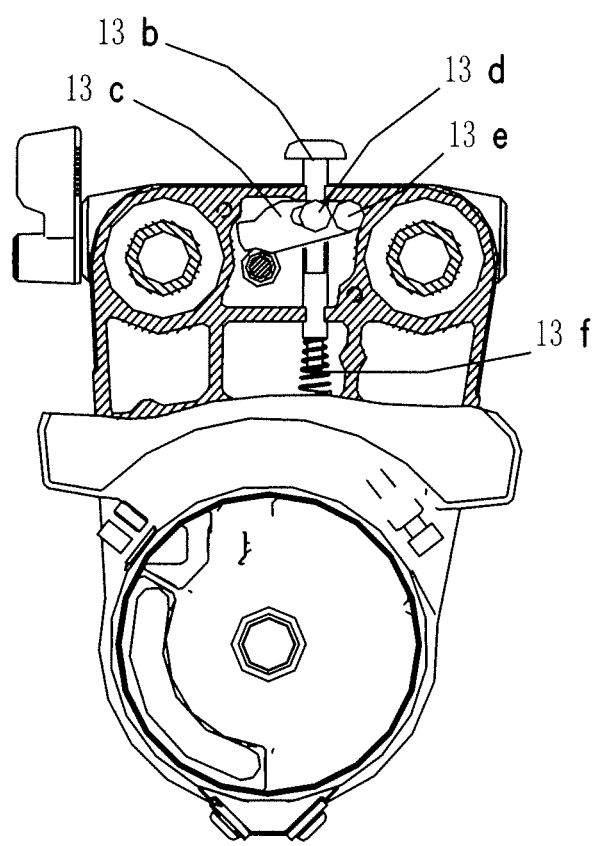
FIG. 8a is a structural schematic view illustrating a locking member of the sliding fixed-length mechanism for the cutting head which is located at an upper stop position.
Figure 8B:
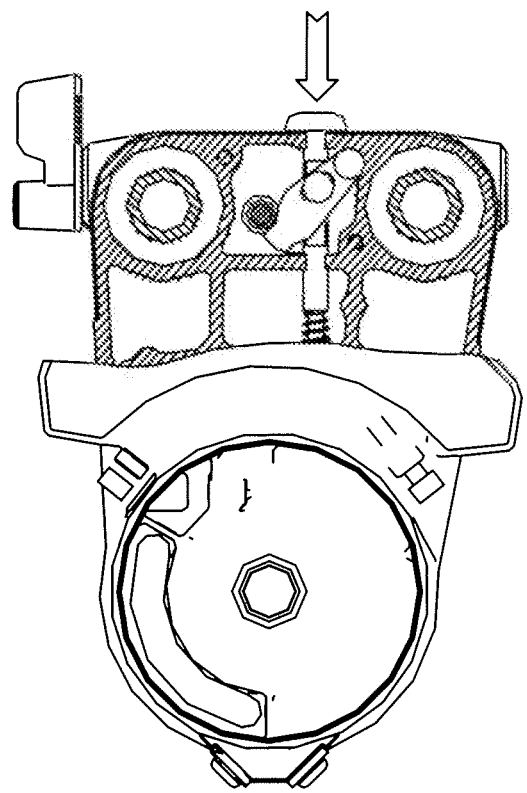
FIG. 8b is a structural schematic view illustrating the locking member of the sliding fixed-length mechanism for the cutting head which is located at a lower stop position.
Figure 8C:
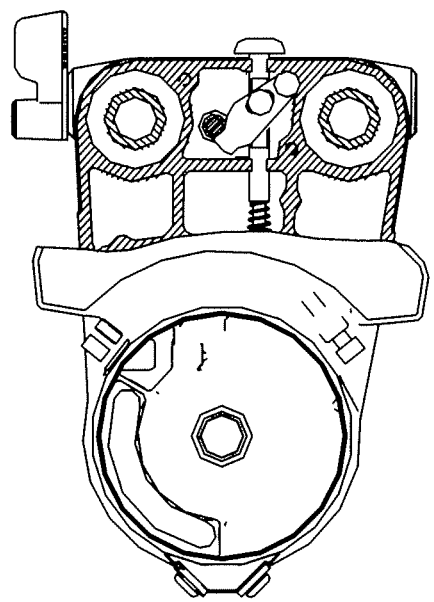
FIG. 8c is a structural schematic view illustrating the locking member of the sliding fixed-length mechanism for the cutting head which is located at a locking position.
Figure 9:
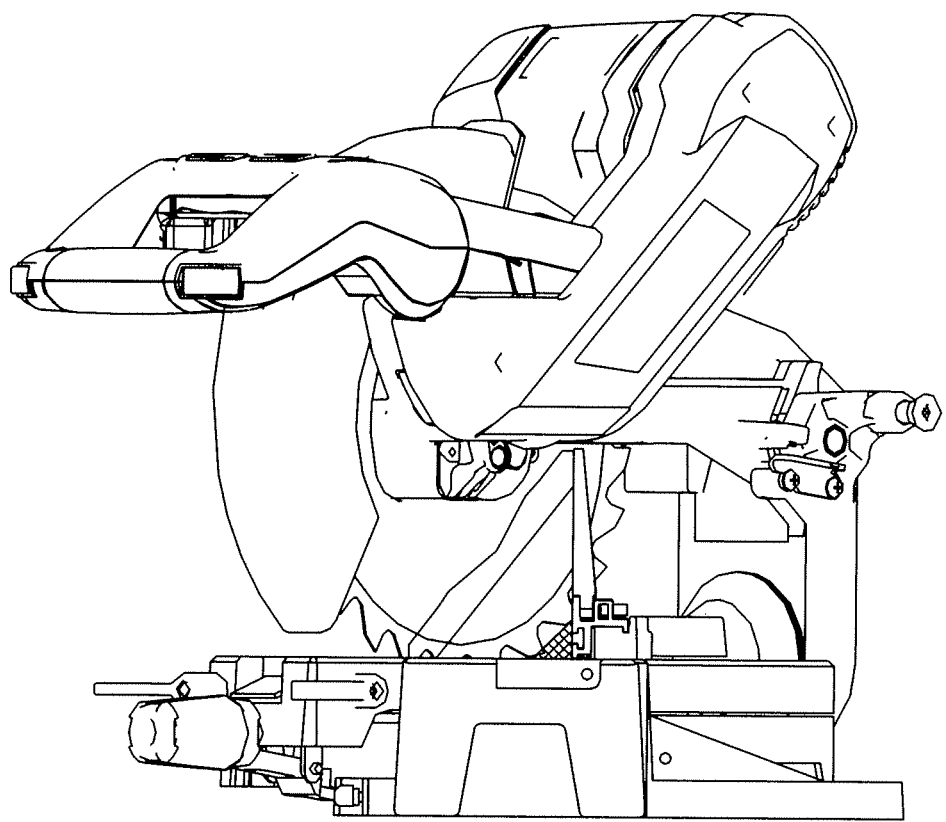
FIG. 9 is a schematic view illustrating the utilization of a head section for stopping the upward position.

As shown in FIGS. 6, 8 and 9, the sliding-rod type miter saw further comprises a sliding fixed-length mechanism for the cutting head which is able to easily fix the cutting head 11 at a certain position (for example, a middle position where the cutting head has moved forward a distance L1 from a rearmost position) between the foremost position and the rearmost position of the cutting head relative to the swing arm assembly. The specific structure of the sliding fixed-length mechanism for the cutting head is as follows. A fixed-length rod 14b extending along the sliding direction of the cutting head is fixed on a front carrier 14a of the sliding rod assembly and has a locking groove 14c. A pin-shaped locking member 13b on the swing arm assembly 13 is installed in a hole of the swing arm 13a and can move up and down linearly.

A hook 13c is rotatably fixed on the swing arm 13a by a swivel screw 13e and at the same time connected with the locking member 13b by a guide screw 13d, which ensures that the hook 13c can perform the rotary motion within a certain angle range along with the linear motion of locking member 13b.

The locking member 13b has an upper stop position, a lower stop position and a locking position. Usually, the locking member 13b and the hook 13c are stopped at the upper stop position under the effect of a return spring 13f. At this time, there is no effect between the hook 13c and the fixed-length rod 14b at the rear end of the sliding rod assembly 14. When the locking member 13b is pressed to the lowermost position, the locking member 13b drives the hook 13c to rotate downward. The fixed-length rod 14b can still freely enter into and come out from the swing arm assembly 13 after pushing the cutting head 11 forward.

When the cutting head 11 is pushed to a position near the rearmost position, the locking member 13b is released, and the hook 13c will move upward along with the locking member 13b. Due to the fixed-length rod 14b, the hook 13c and the locking member 13b are blocked and cannot move upward. However, when the head section is pulled forward again, a portion of the hook can enter into the locking groove 14c on the fixed-length rod 14b automatically. At the same time, the relative position of the sliding rod assembly 14 and the swing arm 13a is locked.

When the large sized decorative strip needs to be cut, the operation can be performed in accordance with the following steps: (1) pulling the cutting head 11 forward and allowing the fixed-length rod 14b away from the swing arm assembly 13; (2) pressing down the locking member 13b; (3) pushing the cutting head 11 rearward and allowing the fixed-length rod 14b to substantially enter into the swing arm assembly 13; (4) releasing the locking member 13b and pulling the cutting head 11 forward and slowly till the sound is appeared to indicate that the hook has entered into the groove and then the whole pull rod assembly is locked; and (5) cutting the decorative strip.

The steps for resorting back to a normal operation are as follows: (1) pressing down the locking member 13b; (2) pulling the cutting head 11 forward and allowing the fixed-length rod away from the swing arm assembly 13 completely; and (3) releasing the locking member 13 to completely unlock.

By equipping the miter saw with the additional structure, large sized decorative strips (for instance, 6 inches) at various leaning angles can be cut by the commonly used small sized miter saw (for example, a 10 inch miter saw) without influencing the normal cutting parameters and basic structure of the miter saw. Certainly, for the miter saw with a larger size, this arrangement is also helpful to improve the cutting capacities for the decorative strips such that it can be applicable to cut the decorative strips with special sizes.

The above structures and the operation method are designed for a pull-rod type miter saw for 10 inches, which can also be applied to a miter saw with a size of more than 10 inches, such as a miter saw for 12 inches. Also, the above mentioned manner of the hook is just one embodiment, and the hook could be replaced with multiple alternatives known to those of ordinary skill in the art For the above mentioned third triangle area, except for control by the stroke of the pull-rod, it also can be accomplished by arranging the stop positions corresponding to different lifting positions of the head section. Additionally, as shown in FIG. 9, this manner is not limited to the pull-rod type miter saw.

The present invention has been disclosed by the embodiments above but should not be limited to these embodiments. Any technical solutions obtained by using equivalent replacements or transformations are regarded as falling within the protection scope of the present invention.

What is claimed is:
1. A miter saw, comprising:
a rotary-disc assembly;
a swing arm assembly rotatably coupled with the rotary-disc assembly;
a sliding rod assembly slidably coupled with the swing arm assembly;
a cutting head rotatably coupled with the sliding rod assembly around a turning shaft of a head section, wherein the cutting head comprises a sliding fixed-length mechanism for the cutting head which is used to fix the cutting head to a specific position relative to the swing arm assembly;
wherein the sliding fixed-length mechanism comprises a fixed-length rod located on the sliding rod assembly and extending along a sliding direction of the cutting head, and a locking device located on the swing arm assembly for locking the fixed-length rod at a specific position;
wherein the locking device comprises a locking member mounted on the swing arm and is able to move up and down linearly, a hook rotatably coupled to the swing arm and simultaneously coupled with the locking member by a guide screw, and a return spring arranged between the locking member and the swing arm assembly;
wherein a locking groove is arranged at the end of the fixed-length rod;
wherein the locking member has three positions relative to the swing arm comprising an upper stop position, a lower stop position, and a locking position where a portion of the hook enters into the locking groove on the fixed-length rod; and wherein when the cutting head is fixed at the specific position and pivoted around the turning shaft to a lowermost cutting position, and an intersecting point between a plane of a supporting surface of a fence and a cutting edge of a saw-blade is located above an intersecting line between the supporting surface of the fence and a supporting surface of a base plate.

2. The miter saw according to claim 1, wherein the fixed-length rod is mounted on the rear end of the sliding rod assembly.

* * * * *